(12) United States Patent
Artman et al.

(10) Patent No.: US 7,952,874 B2
(45) Date of Patent: May 31, 2011

(54) PLANER BOARD WITH INTEGRATED COLD PLATE

(75) Inventors: Paul T. Artman, Austin, TX (US);
Shawn P. Hoss, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 12/166,016

(22) Filed: Jul. 1, 2008

(65) Prior Publication Data
US 2010/0002376 A1    Jan. 7, 2010

(51) Int. Cl.
*H05K 7/20* (2006.01)
*F28F 7/00* (2006.01)

(52) U.S. Cl. ....... 361/699; 165/80.4; 361/701; 361/702; 361/711

(58) Field of Classification Search .................. 361/696, 361/699, 701–702
See application file for complete search history.

(56) References Cited

U.S. PATENT DOCUMENTS

| | | | | |
|---|---|---|---|---|
| 4,884,168 A * | 11/1989 | August et al. | ................ | 361/702 |
| 4,965,699 A | 10/1990 | Jorden et al. | | |
| 5,014,904 A * | 5/1991 | Morton | ........................ | 228/176 |
| 5,070,936 A * | 12/1991 | Carroll et al. | ................ | 165/80.4 |
| 5,285,347 A * | 2/1994 | Fox et al. | ....................... | 361/699 |
| 5,325,265 A * | 6/1994 | Turlik et al. | .................. | 361/702 |
| 5,343,359 A * | 8/1994 | Morton et al. | ................ | 361/707 |
| 5,761,035 A * | 6/1998 | Beise | ........................ | 361/699 |
| 5,761,043 A * | 6/1998 | Salmonson | ................... | 361/707 |
| 5,768,104 A * | 6/1998 | Salmonson et al. | .......... | 361/704 |
| 5,801,924 A * | 9/1998 | Salmonson | ................... | 361/719 |
| 6,166,775 A * | 12/2000 | Fukuda | ........................ | 348/537 |
| 6,205,022 B1 | 3/2001 | Bhatia et al. | | |
| 6,305,463 B1 | 10/2001 | Salmonson | | |
| 6,411,512 B1 * | 6/2002 | Mankaruse et al. | .......... | 361/700 |
| 6,903,933 B2 | 6/2005 | Wang | | |

* cited by examiner

*Primary Examiner* — Gregory D Thompson
(74) *Attorney, Agent, or Firm* — Baker Botts L.L.P.

(57) ABSTRACT

A cooling system for an information handling system is provided in which a cold plate is coupled to the motherboard of the computer system. The cold plate includes a number of cold pads that are located on the pan to correspond to the location of heat-emitting components on the motherboard. Chilled water is circulated through the cold pads to remove heat from the vicinity of the heat-emitting components. A heat exchanger may be coupled to the cold plate.

21 Claims, 2 Drawing Sheets

PLANER BOARD WITH INTEGRATED COLD PLATE

TECHNICAL FIELD

The present disclosure relates generally to computer systems and information handling systems, and, more particularly, to an information handling system that includes a planer board that includes an integrated cold plate.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Excessive heat within the interior of a computing system can damage the computer system and reduce its operating efficiency. Over time, computer systems have included an increasingly dense collection of high power and heat-emitting components on the planer board of the computer system. The planer board of the computer system is the board on which all of the components of the computer system are mounted. Conventional cooling schemes for heat-emitting components have involved the use of large local heat sinks placed on or hear the component to be cooled, together with the use of fans to direct the heated air at the heat sink away from the interior of the computer system. Because of the small surface area of some of the heat-emitting components in the interior of a computer system, large increases in fan speed and corresponding power consumption are required to achieve even modest decreases in temperature at the heat-emitting component.

SUMMARY

In accordance with the present disclosure, a cooling system for an information handling system is provided in which a cold plate is coupled to the motherboard of the computer system. The cold plate includes a number of cold pads that are located on the pan to correspond to the location of heat-emitting components on the motherboard. Chilled water is circulated through the cold pads to remove heat from the vicinity of the heat-emitting components. A heat exchanger may be coupled to the cold plate.

The cooling system described herein is technically advantageous because the cold plate design described herein provides a thermal management solution that is low cost and easy to install. The cooling design described herein is advantageous because it exists below the motherboard and therefore does not consume or interfere with any of the components on the motherboard. Further, because the design of the cold plate may follow the geometric pattern of the heat emitting components on the top surface of the motherboard, the cold plate design does not affect and can accommodate any design of components on the top surface of the motherboard. The cold plate design described herein is also advantageous in that it reduces the need for fan cooling in the system, while still accommodating system designs that include fans for systems that require or benefit from both conduction cooling and convection cooling. Because of the need for fan cooling is diminished or eliminated, power consumption from fans is likewise diminished or eliminated. Similarly, the reduction in the use of fans in the interior of a computer system tends to reduce the noise produced by the computer system. If a fan is used in conjunction with the cold plate design, the fan may be more efficient, as a substantial percentage of the heat generated by the component will be removed by the cold plate, resulting in the fan blowing relatively cooler air in the interior of the computer system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
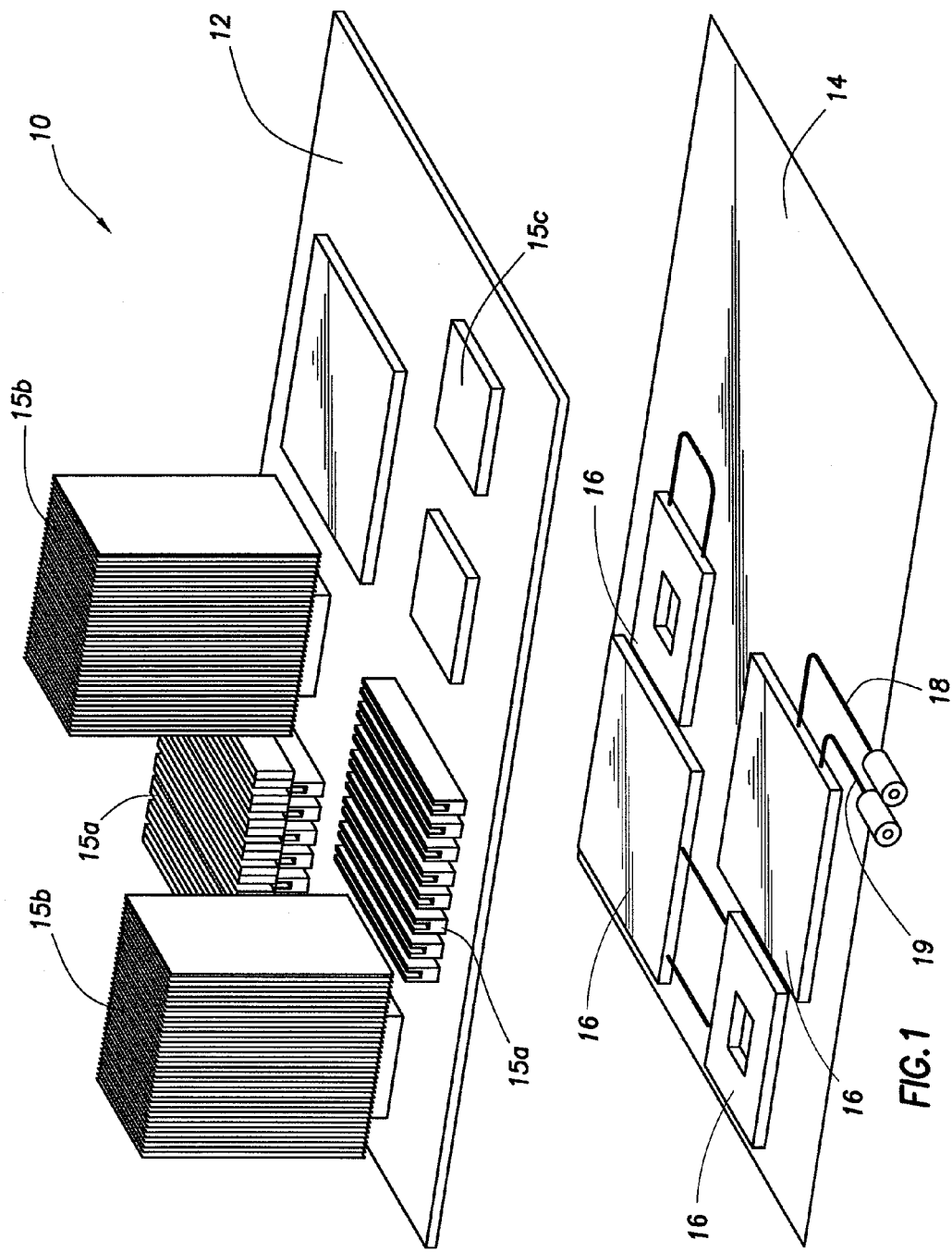
FIG. 1 is an exploded view of a cooling system.

Shown in FIG. 1 is an exploded view of the interior components of an information handling system, which is indicated generally at 10. The components of the computer system of claim 10 include a planer board that is comprised of a motherboard 12 and a metal pan 14. Motherboard 12 includes a number of board-level components that are indicated at 15 and coupled to the top surface of the motherboard. In the example of FIG. 1, components 15 include memory and memory slots 15a, components mated to a heat sink 15b, and other components 15c on the motherboard. In the orientation of FIG. 1, the visible surface of the motherboard is considered the top surface of the motherboard. These components emit heat and may include the processor, or components with an even smaller footprint, such as transistors, capacitors, and application-specific integrated circuits. Pan 14 supports motherboard 12 and keeps the motherboard secure and rigid. Pan 14 may be coupled to the motherboard through a set of screws in the interior or perimeter of each of the pan and the motherboard. Pan also includes a set of connection points for connecting the pan to the remainder of the chassis or housing (not shown) of the computer system. Pan 14 also performs the function of a cold plate. Integrated into pan 14 are a number of cold pads 16. The collection of cold pads comprises a cold plate. In the example of FIG. 1, the cold pads are interconnected by a series of pipes that provide for the circulated of cooled or room temperature water or other fluid into, through, and out of the cold pads. Each cold pad and the collection of cold pads have a geometric configuration and footprint that matches the geometric configuration and footprint of the heat-emitting components directly above the cold pads on the motherboard of the computer system. It is not necessary, however, for the footprint of the pads of the cold plate correspond to the footprint of the heat-emitting devices of the motherboard, as cooling of these heat-emitting devices can occur even if the source of the cooling is not directly below the heat-emitting device.

In operation, chilled water is circulated through the cold pads. Chilled water enters the first of the series of cold pads through an inlet 18. A heat exchange occurs between the heated air and components on the motherboard and the chilled water. As the water is circulated out of the cold pads through an outlet 19, the warmed water removes heat from the vicinity of the heat-emitting components of the motherboard. In operation, the cold pads are maintained at a constant temperature that is lower than the standard operating temperature of the corresponding heat emitting components. The supply of chilled water to the cold pads can be supplied from a source internal to the system or can be supplied from a source external to the system.

Figure 2:
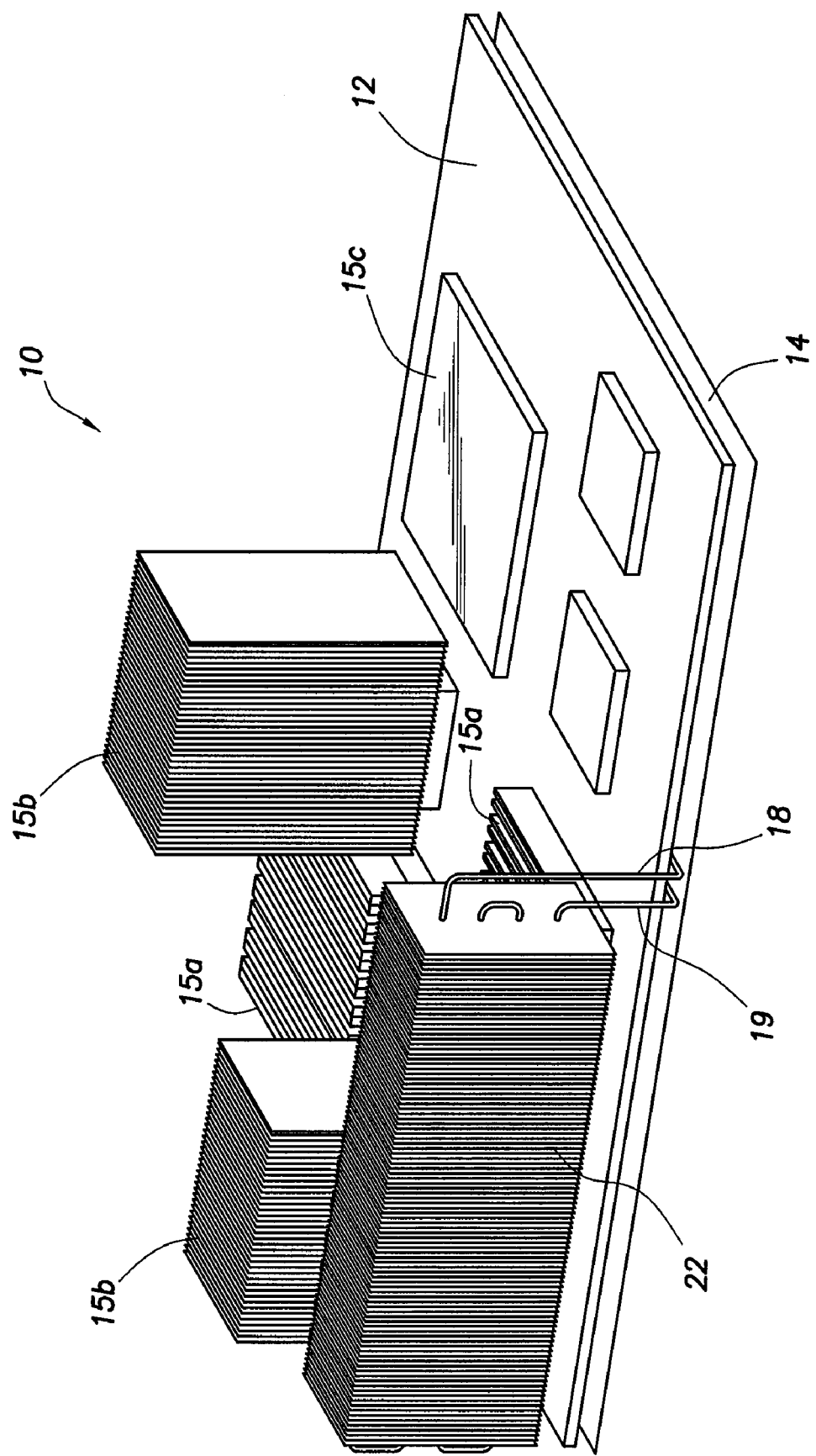
FIG. 2 is a pictorial view of a cooling system coupled to a motherboard and including a heat exchanger.

The pipes of the cold pad are coupled to a heat exchanger that is included in the chassis of the computer system. An example of this design is shown in FIG. 2. The chassis level heat exchanger 22 of FIG. 2 is coupled to the inlet pipe 18 and outlet pipe 19 of the series of cold pads. Depending on the design of the interior of the system and the placement of fans in the interior of the system, the air that is passed through the heat exchanger may be heated air or non-heated air. With respect to the flow of forced air for convection cooling through the interior of the system, the heat exchanger can be placed upstream or downstream of the motherboard components and can therefore receive either heated or non-heated. As an alternative to placing the heat exchanger in the interior of the computer system in the vicinity of the motherboard, the heat exchanger could also be located exterior to the housing of the computer system, which provides the advantage of removing the heat load from the interior of the computer system. The heat exchanger could also comprise a common heat exchanger that serves a set of computer systems located in a data center. The heat exchanger of a data center could be located in the data center, or outside of the data center. The placement of the heat exchanger outside of the data center would have the added benefit of removing the heat load from the data center.

The pan, including the cold pads of the cold plate, may be coupled to the motherboard through any suitable connection. Although it is desirable for the pan to be directly adjacent to the motherboard, the pan and the motherboard may be separated from one another by a thermal gap to accommodate the height of the cold pads from the surface of the pan and the protrusion of components on the bottom surface of the motherboard.

As an alternative to the inclusion of a cold plate in a pan, and the coupling of the pan to the motherboard as a physical support for the motherboard, the cold plate could comprise a separate fixture that is coupled directly to and comprise part of the chassis of the system. In this configuration in which the cold plate is coupled to and forms part of the chassis, the motherboard, which may have a supporting pan attached thereto, would be coupled to the cold plate through a suitable fixture, including screws, rivets, soldering, or adhesive. In this example, the pads of the cold plate may be coupled to the top or bottom surface of the pan to correspond to the footprint of the heat-emitting devices on the top surface of the motherboard. It is not necessary that the footprint of the pads of the cold plate correspond to the footprint of the heat-emitting devices of the motherboard, as cooling of these heat-emitting devices can occur even if the source of the cooling is not directly below the heat-emitting device.

Although the cold plate design described herein is included in a system that includes components with associated heat sinks, it should be understood that the cold plate cooling system may provide sufficient cooling that convention could be eliminated from the design of the server system. The cold plate design described herein also provides a thermal management solution that is low cost and easy to install. The cooling design described herein is advantageous because it exists below the motherboard and therefore does not consume or interfere with any of the components on the motherboard. Further, because the design of the cold plate may follow the geometric pattern of the heat emitting components on the top surface of the motherboard, the cold plate design does not affect and can accommodate any design of components on the top surface of the motherboard. The cold plate design described herein is also advantageous in that it reduces the need for fan cooling in the system, while still accommodating system designs that include fans for systems that require or benefit from both conduction cooling and convection cooling. Because of the need for fan cooling is diminished or eliminated, power consumption from fans is likewise diminished or eliminated. Similarly, the reduction in the use of fans in the interior of a computer system tends to reduce the noise produced by the computer system. If a fan is used in conjunction with the cold plate design, the fan may be more efficient, as a substantial percentage of the heat generated by the component will be removed by the cold plate, resulting in the fan blowing relatively cooler air in the interior of the computer system.

Although the present disclosure has been described in detail, it should be understood that various changes, substitutions, and alterations can be made hereto without departing from the spirit and the scope of the invention as defined by the appended claims.

What is claimed is:

1. A cooling assembly for an information handling system, comprising:
   a motherboard, wherein the motherboard includes a heat-emitting component, a pan, wherein the pan includes a cold plate,
  wherein the cold plate is integrated into the pan;
  wherein the cold plate includes multiple cold pads, wherein the cold pads are interconnected by a series of circulation pipes;
  wherein the pan is coupled to the motherboard.

2. The cooling assembly of claim 1,
  wherein the motherboard includes multiple heat-emitting elements; and
  wherein the multiple cold pads are positioned on the pan to correspond to the location of the heat-emitting elements.

3. The cooling assembly of claim 1, wherein water is circulated through the multiple cold pads.

4. The cooling assembly of claim 3, wherein the cold plates includes a water inlet and a water outlet.

5. The cooling system of claim 3, wherein the water is chilled water and the source of the chilled water is internal to the information handling system.

6. The cooling assembly of claim 3, wherein the water is chilled and the source of the chilled water is external to the information handling system.

7. The cooling assembly of claim 1, wherein the mother board is mounted directly against the cold plate.

8. The cooling assembly of claim 1, wherein a gap exists between the motherboard and the cold plate.

9. The cooling assembly of claim 1, further wherein the motherboard includes a heat exchanger.

10. The cooling assembly of claim 7, wherein the information handling system includes a convention cooling system and a heat exchanger receives non-heated air from a convection cooling system.

11. The cooling assembly of claim 7, wherein the information handling system includes a convention cooling system and a heat exchanger receives heated air from a convection cooling system.

12. The cooling assembly of claim 1, wherein the cooling assembly of the information handling system does not include the convection cooling.

13. The cooling assembly of claim 1, wherein the information handling system includes a chassis and wherein the pan is coupled to the chassis.

14. A method for cooling the heat-emitting components of a motherboard of a computing system, comprising:
  providing a pan, wherein the pan is coupled to the motherboard, and wherein the pan includes a cold plate, and wherein the cold plate is integrated into the pan, and wherein the cold plate includes multiple cold pads, and wherein the cold pads are interconnected by a series of circulation pipes; and
  actuating the cold plate to circulate cooled air through the cold plate to remove heat from the vicinity of the heat-emitting components of the motherboard.

15. The method for cooling the heat-emitting components of a motherboard of claim 14, wherein the pan is in contact with the motherboard.

16. The method for cooling the heat-emitting components of a motherboard of claim 14, wherein a thermal gap is between the motherboard and the pan.

17. The method for cooling the heat-emitting components of a motherboard of claim 14, further wherein the motherboard includes a heat exchanger.

18. The method for cooling the heat-emitting components of a motherboard of claim 14, wherein cold pads are located in the pan to correspond to the location of heat-emitting components on the motherboard.

19. A cooling system for a computing system, comprising a pan operable to be coupled to a motherboard of the computing system, wherein the pan includes a cold plate integrated into the pan, wherein the cold plate includes multiple cold pads, wherein the cold pads are interconnected by a series of circulation pipes.

20. The cooling system of claim 19, wherein the motherboard includes multiple heat-emitting components and wherein the cold pads are located in the cold plate to correspond to the location of the heat-emitting elements on the motherboard.

21. The cooling system of claim 19, further comprising a heat exchange coupled to the cold plate.

\* \* \* \* \*